K. C. LAUGHLIN.
VEHICLE WHEEL.
APPLICATION FILED JUNE 1, 1910.

997,837.

Patented July 11, 1911.

Witnesses
Cale Richardson
U. B. Willyard

Inventor
Kern C. Laughlin,
By Victor J. Evans
Attorney

UNITED STATES PATENT OFFICE.

KERN C. LAUGHLIN, OF HIGH BRIDGE, KENTUCKY.

VEHICLE-WHEEL.

997,837.   Specification of Letters Patent.   Patented July 11, 1911.

Application filed June 1, 1910. Serial No. 564,533.

*To all whom it may concern:*

Be it known that I, KERN C. LAUGHLIN, a citizen of the United States, residing at High Bridge, in the county of Jessamine and State of Kentucky, have invented new and useful Improvements in Vehicle-Wheels, of which the following is a specification.

The present invention appertains to the type of vehicle wheels embodying a yieldable rim portion for absorbing or neutralizing shock and vibration incident to passing over rough roads, and has for its object to devise a novel form of wheel which will admit of the rim portion having a limited circumferential movement in conjunction with a radial movement in the plane of the wheel and which at the same time will involve a substantial and durable structure and brace the rim portion against lateral strain.

The invention consists of the novel features, details of construction and combination of parts, which hereinafter will be more particularly set forth, illustrated in the accompanying drawing, and pointed out in the appended claim.

Figure 1:
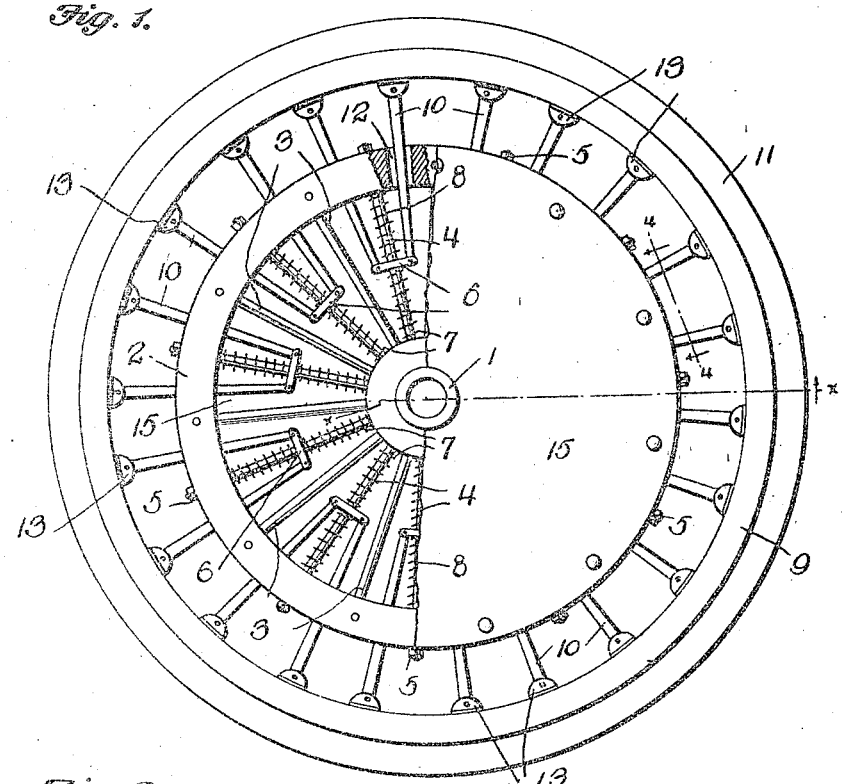
Figure 2:
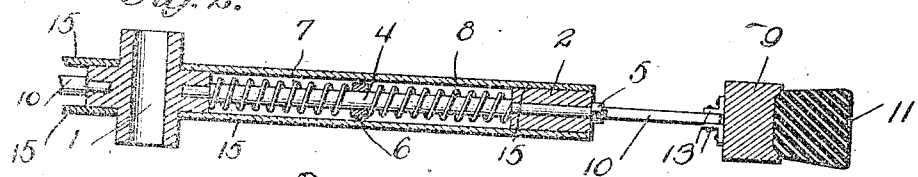
Figure 4:
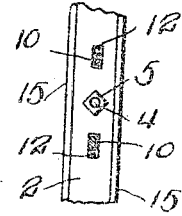
Figure 3:
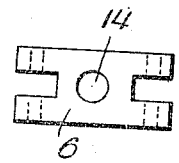

Referring to the drawing, forming a part of the application, Figure 1 is a side view of a vehicle wheel embodying the invention, parts being broken away. Fig. 2 is a cross section on the line x—x of Fig. 1. Fig. 3 is a plan view of one of the cross heads. Fig. 4 is a sectional detail on the line 4—4 of Fig. 1.

Corresponding and like parts are referred to in the following description, and indicated in all the views of the drawing, by the same reference characters.

The wheel embodies inner and outer portions. The inner portion consists of a hub 1, a rim 2 and spokes 3, the latter being rigidly secured at their ends both to the hub and rim 2. The several parts of the inner portion of the wheel may be of any construction. Guide rods 4 are secured at their inner ends to the hub 1 and at their outer ends to the rim 2 and are located intermediate of the spokes 3. The guide rods 4 pass through openings in the rim 2 and their outer ends are threaded and receive nuts 5. While the primary intent of the guide rods 4 is to support cross heads 6 and springs 7 and 8 it is also understood that said guide rods also act as ties to hold the rim 2 and spokes 3 in proper position with reference to one another and the hub 1.

The outer portion of the wheel consists of a felly or rim 9 and spokes 10, the rim 9 being of any construction and receiving a tire 11 either of rubber, metal or other material. The spokes 10 are pivotally connected at their outer ends to the rim 9 and pass through openings 12 in the rim 2 and are connected at their inner ends to the cross heads 6, which are slidably mounted upon the guide rods 4. The rim 9 is provided upon its inner side with sockets 13 to which the outer ends of the spokes 10 are pivotally connected. The cross heads 6 are bifurcated at their ends and receive the inner ends of the spokes 10 between the bifurcations to which they are pivotally connected. Each cross head 6 is provided at a middle point with an opening 14, through which a guide rod 4 passes. The openings 12 in the inner rim 2 are elongated circumferentially and are formed with parallel sides, which engage opposite sides of the spokes 10, thereby preventing any lateral play of said spokes 10 or the outer portion of the wheel. By having the openings 12 elongated circumferentially the rim 9 is permitted to have a limited circumferential movement, which is of advantage in overcoming torsional strain. The spokes 10 consist of flat bars which taper slightly throughout their length and are provided at their ends with eyes to receive the pins or like fastenings by means of which they are pivotally connected to the cross heads and the outer rim or felly 9. The spokes are arranged with their wider ends outermost, so as to sustain lateral strain and to give greater stability to the wheel.

The springs 7 and 8 are of helical form and expansible and are mounted upon the guide rods 4 upon opposite sides of the cross heads 6. In practice the inner springs 7 are subjected to compression when sustaining the load and the outer springs 8 are likewise subjected under like conditions to compression, the inner springs being compressed when below the hub and the outer springs being compressed when above the hub. Plates 15 inclose the inner portion of the wheel and prevent foreign matter interfering with the free action of the springs and cross heads. The plates 15 are slipped upon end portions of the hub 1 and are bolted or otherwise secured to the inner rim 2.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claim appended hereto.

Having thus described the invention what is claimed as new, is:—

A vehicle wheel comprising a hub, an inner rim provided at intervals with openings circumferentially elongated, spokes connecting the inner rim with the hub, guide rods supported at their ends by means of the hub and inner rim, cross heads slidably mounted upon the rods, springs mounted upon the guide rods and located upon opposite sides of the cross heads between them and the hub and inner rim, an outer rim, and spokes passed through the elongated openings of the inner rim and having their outer ends pivotally connected to the outer rim and their inner ends pivotally connected to the ends of said cross heads.

In testimony whereof I affix my signature in presence of two witnesses.

KERN C. LAUGHLIN.

Witnesses:
M. O. DEVER,
JAMES R. DORMAN.